Patented May 6, 1930

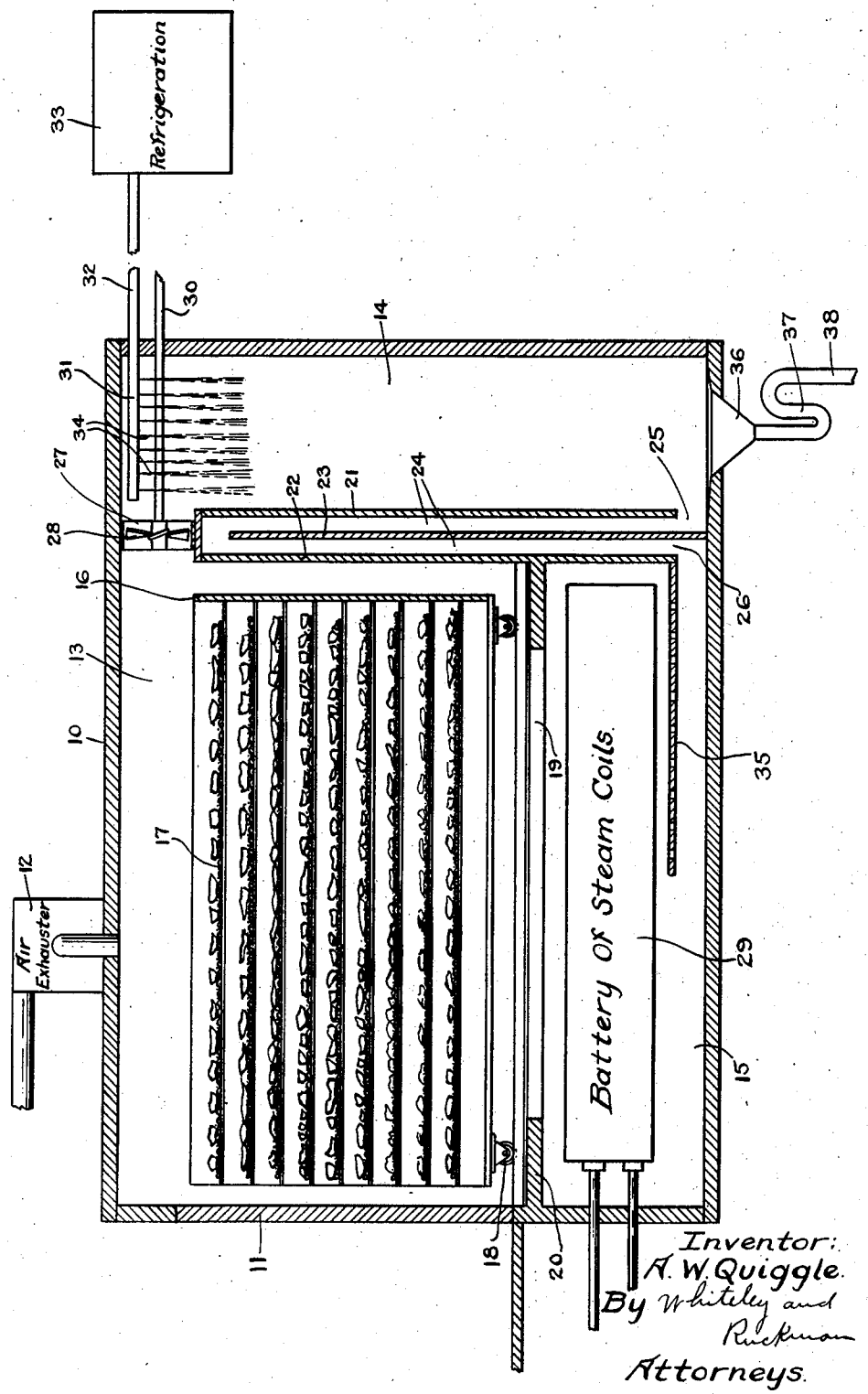

1,756,992

UNITED STATES PATENT OFFICE

ARTHUR W. QUIGGLE, OF MINNEAPOLIS, MINNESOTA, ASSIGNOR TO THE CREAMETTE COMPANY, OF MINNEAPOLIS, MINNESOTA, A CORPORATION

PROCESS OF DRYING MACARONI AND OTHER PRODUCTS MADE FROM A PASTE OF FLOUR AND WATER

Application filed December 7, 1925. Serial No. 73,580.

My invention relates to a process of drying marcaroni and other products made from a paste of flour and water.

The so-called alimentary paste products are made by mixing together a certain kind of wheat flour known as semolina with water and other ingredients whereby a stiff but moist paste is formed. This paste is forced through dies by which the product is molded. The dies for the macaroni make a hollow tube product and for the spaghetti and vermicelli a closed cylinder product. Other paste products, such as noodles, are made with the same kind of paste but with a different type of machine. In any case, however, the product after being formed must be dried. In any case the product before it is ready for packaging and the market must have nearly all of its water content removed by a drying process. As heretofore practiced, and for a very large number of years, the drying has been effected in large rooms where the product is hung up or otherwise disposed where it is subjected to air at atmospheric temperature or of slightly higher than atmospheric temperature, the air entering and leaving the room under very little forced draft.

Drying by this process is very slow, the entire operation running over the better part of a week, consequently a large amount of space is necessary in which to effect the drying operation.

I have discovered that the use of currents of heated air is effective for drying macaroni provided the air is heated to a temperature higher than the one naturally assumed to be proper. That is, to a temperature of over one hundred fifty degrees Fahrenheit, as appears from my co-pending application, Serial Number 394,741. In that process the air currents after being passed through the macaroni are wasted and are, of course, subject to the variations of atmospheric conditions due to weather conditions.

I have now discovered that it is possible to dry macaroni by the use of currents of air most effectively where the same air is circulated in a closed chamber, passing through the macaroni being dried, having its moisture content removed and subsequently again passing through the macaroni with a continuous repetition of the process until the macaroni is thoroughly dried. I have also discovered that with this system of circulating the air it is practicable to reduce the pressure within the chamber to such degree of vacuum as may be desirable, and that this has the effect of decreasing the temperature of the air which can be used while maintaining its relation to the boiling point at the pressure employed constant.

There are several ways in which the heat relatively may be given to the residual air in the vacuum chamber, as, for example, the macaroni itself may be heated to a relatively high temperature at the dies and immediately conveyed into the vacuum chamber, where the reduction in pressure will produce a relatively high vaporization point in the heated macaroni, and a very small amount of circulation of the residual air, with withdrawal of moisture during that circulation, will produce effective and complete drying. The residual air may be heated by circulating it within the vacuum chamber and passing it through heated steam coils before the air goes through the macaroni.

In a preferred form of my process the macaroni will be placed upon trays as it comes from the machine, which trays are mounted upon a box-like truck member with a side closure door, which member is open at top and bottom, forming a passage directly through the same and through the reticulate floors of the trays upon which the macaroni rests. The macaroni may be introduced into the trays at normal temperatures or heated as above stated. The trucks carrying the stock of trays will be passed through a sealing door into the vacuum chamber and when the door is closed the chamber will be air-tight. The vacuum chamber will comprise three compartments,—a material receiving compartment where the truck holding the trays of material will be positioned, which compartment will have an opening at the bottom registering with the bottom opening in the truck, and an opening at one end extending into the second compartment. Here the water in the air that has passed through the macaroni will be removed. This may be done by a spray of refrigerated water falling into the second compartment, of water absorbents such as calcium chloride may be employed in the second compartment. Preferably a refrigerated water spray will be used, as that is cheap and efficient. The air passes downward through the second compartment to a heating compartment located directly below the material receiving compartment. This will preferably comprise a battery of heated steam pipes through which the air must pass in going from the water precipitating compartment to the material drying compartment.

Between the first compartment and the second compartment a fan will preferably be located, by which the residual air in the drying chamber is caused to circulate, the fan drawing heated air from the steam coils below through the material on the truck and forcing the heated air into the water precipitating chamber where the spray of refrigerated water will cause most of the moisture in the air as it comes from the macaroni to be withdrawn or precipitated with the refrigerated water, this precipitation being effected by the sudden cooling of the air as it is forced into the precipitating chamber. The spray of refrigerated water and the precipitated water will be drained away from the bottom of the precipitating chamber and a vertical passageway having a baffle across the center of it will convey the air from the precipitating chamber, first to the top thereof and then to the bottom and into the heating chamber so that free water will not be carried over.

A diagrammatic view is here given of an apparatus for carrying out my process. No claim is here made to any specific features of this apparatus, and it will be understood that many different forms of apparatus or devices for effecting the steps of my process may be employed and be within the scope of my invention. In this diagram a casing 10 forms an air-tight chamber which is provided with door 11. This chamber is adapted to be sealed by the door when closed tight. An exhausting device 12 is adapted to reduce the pressure within the chamber to any desired degree. The chamber has a drying compartment 13, a water precipitating compartment 14 and a heating compartment 15. A truck 16 provided with a multiplicity of trays 17, each having a reticulate bottom and each adapted to receive therein layers of macaroni, is rolled into the chamber 13 upon rollers or castors 18 overlying the chamber 15 and particularly an opening 19 extending through a floor partition 20 between the chambers 13 and 15. The chamber 14 is separated from the chambers 13 and 15 by means of a vertical partition shown as having outer walls 21 and 22 and an inner wall 23 with a continuous passageway 24 between said walls, which passageway is connected by an opening 25 with the precipitating chamber 14 and by an opening 26 with the heat generating chamber 15. The chambers 13 and 14 are entirely separated excepting for a fan opening 27 having therein a fan 28 by means of which the air is drawn from the chamber 13 and forced into chamber 14 and caused to circulate through chamber 14, into and through passageway 24, into and through chamber 15 and a battery of steam pipes 29 therein, and through opening 19 and the macaroni trays 17 on the truck 19. Power is communicated to the fan 28 from any appropriate source by means of a shaft 30. A water pipe system 31 is connected by a pipe 32 with any appropriate refrigerating means, indicated diagrammatically at 33. Jets of cold water indicated at 34 are sprayed or atomized into the top of chamber 14, and the water so forced in, together with the water precipitated from the air, flowing through said chamber, collects in a receptacle 36 passing through a trap 37 to any desirable waste means 38.

It will be apparent that with such an apparatus, which may be revised in details as the particular conditions to be met may require, very rapid drying of the macaroni or other paste products may be effected. The cycle of drying operations, of course, comprise—first, the provision of an air-tight chamber, indicated by 10, wherein the air used as a moisture withdrawing medium may be reduced in pressure as desired; second, the introduction of the macaroni on the trays or otherwise disposed into this chamber, which macaroni may, as above noted, be introduced hot; third, the exhaustion of the air from the sealed chamber to the desired pressure, which in practice may be around eight pounds to the square foot; and, fourth, the circulation of the residual air within the drying chamber. This latter step, of course, involves the true drying operation. Because of the low pressure in the drying chamber the vaporizing and boiling point of the moisture in the macaroni is very much reduced. The moisture will travel rapidly from the interior portions of the macaroni to the walls thereof both external and internal, tending to increase the capillarity of the dried product,—that is, rendering the body of the macaroni porous, which makes it easier and quicker cooking. Also, owing to the decrease of pressure of the atmosphere the tendency of the moisture of the macaroni to move freely outwardly will be greatly increased, and also the tendency to increase the porosity of the macaroni.

During the course of the circulation of the air it will first pass, heated to a desired temperature, through and around the moist macaroni, where it will become loaded with water vapor; it will then be forced into the precipitating chamber where it will be brought into contact with the spray of refrigerated water (or with other drying medium). This will effect instant cooling of the saturated air as it comes from the drying chamber and cause precipitation of the moisture of contained therein along with the refrigerated water which is sprayed into the precipitating chamber. The cooled air thus relieved of its water and vapor will pass first through the up-and-down passageway 24, where it will be completely freed of any free water and will pass into the drying chamber under the steam coils where it will be distributed by the baffle 35, and after passing through the steam coils and being heated to the desired temperature will again go through the macaroni, so that the operation is continuous until sufficient drying has been effected.

After the macaroni has been sufficiently dried I have found that excellent results are obtained by permitting it to cool within the sealed drying chamber. It is better during the cooling operation not to have the macaroni subject to drafts of air, and it is within the scope of my invention to cool the drying chamber by causing the cooled air of the precipitating chamber to move around partitioned walls of the drying chamber instead of through the heating chamber and the macaroni. In this manner the macaroni can be cooled with reasonable despatch after it is dried, and when removed upon the truck or other means of introducing it into the drying compartment it will be substantially in condition for immediate packaging.

I claim:

1. The process of drying macaroni and other paste products which consists in positioning the macaroni within a closed chamber, reducing the pressure of the air content of said chamber by exhaustion of a portion of the air therefrom, continuously circulating the residual air in the chamber so as to cause it to pass through the macaroni, and when the macaroni is sufficiently dried cooling the same in the closed chamber without circulation of air.

2. The process of drying macaroni and other paste products which consists in positioning the macaroni within a closed chamber, reducing the pressure of the air content of said chamber by exhaustion of a portion of the air therefrom, continuously circulating the residual air in the chamber so as to cause it to pass through the macaroni, withdrawing moisture from said air at a point in its circulation after it has passed through the macaroni, and when the macaroni is sufficiently dried cooling the same in the closed chamber without circulation of air.

3. The process of drying macaroni and other paste products which consists in positioning the macaroni within a closed chamber, reducing the pressure of the air content of said chamber by exhaustion of a portion of the air therefrom, continuously circulating the residual air in the chamber so as to cause it to pass through the macaroni, heating said residual air at a point in the course of its circulation before it has passed through the macaroni, and when the macaroni is sufficiently dried cooling the same in the closed chamber without circulation of air.

4. The process of drying macaroni and other paste products which consists in positioning the macaroni within a closed chamber, reducing the pressure of the air content of said chamber by exhaustion of a portion of the air therefrom, continuously circulating the residual air in the chamber so as to cause it to pass through the macaroni, withdrawing moisture from said air at a point in its circulation after it has passed through the macaroni, heating said residual air at a point in its circulation before it passes through the macaroni, and when the macaroni is sufficiently dried cooling the same in the closed chamber without circulation of air.

5. The process of drying macaroni and other paste products which consists in positioning of the macaroni within an airtight closed chamber and continuously circulating all the air in the chamber so as to cause it to pass through the macaroni, continuously withdrawing moisture from the air so circulated until the macaroni is sufficiently dried, and thereafter cooling the macaroni in the closed chamber without circulation of air.

In testimony whereof I hereunto affix my signature.

ARTHUR W. QUIGGLE.